Jan. 23, 1968   W. E. JAMES   3,365,238
BALE THROWER
Filed May 25, 1966   2 Sheets-Sheet 1
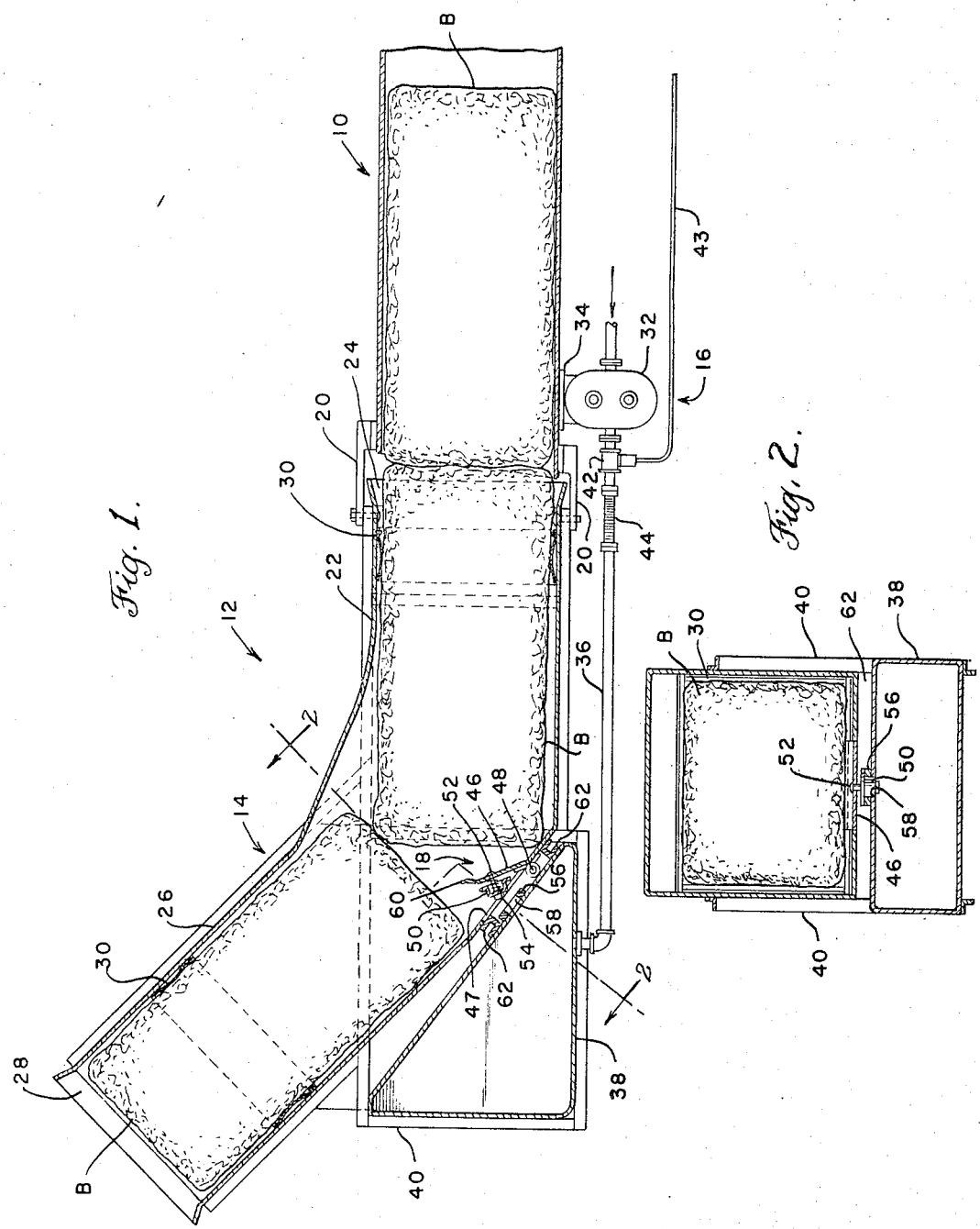
INVENTOR.
WILLIAM E. JAMES
BY Donald O. Schaper
ATTORNEY

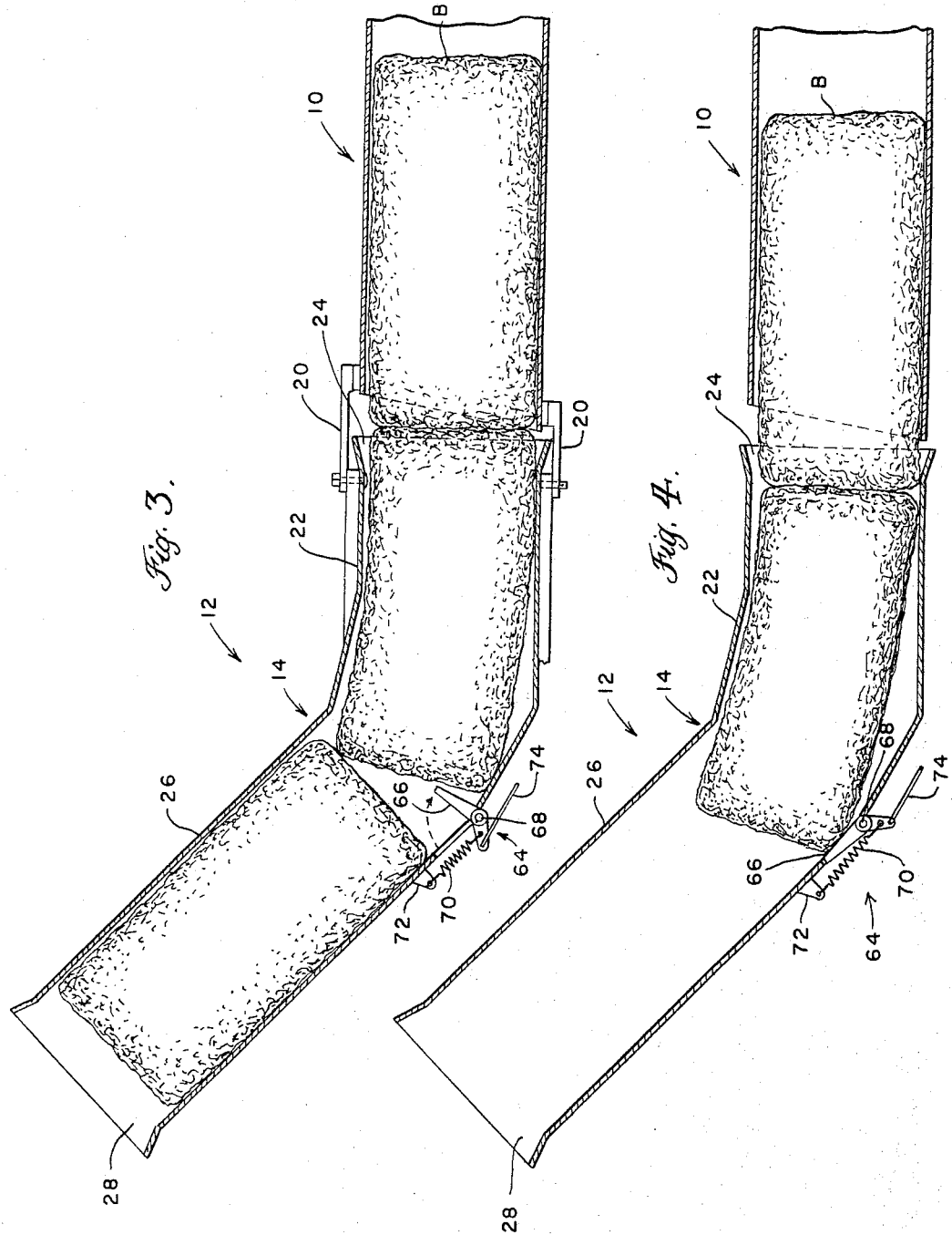

United States Patent Office 3,365,238
Patented Jan. 23, 1968

3,365,238
BALE THROWER
William E. James, 32 Rue Verrerie, Dijon, France
Filed May 25, 1966, Ser. No. 552,969
14 Claims. (Cl. 302—2)

ABSTRACT OF THE DISCLOSURE

A bale throwing device in which the bales are positioned in a conduit and air is directed against one end of the bale to cause the bales to be thrown from the conduit and through a trajectory path.

---

This invention relates to bale handling apparatus, and more particularly, to a bale conveyor to be connected to the discharge end of a hay baler.

Various devices are known which can be mounted on the discharge end of a conventional pick-up hay baler to throw each emerging bale to a trailing wagon. One example of such a bale-throwing device is the U.S. patent to Smoker et al., 3,132,754. The bale conveyor disclosed in the Smoker patent comprises a pair of cooperative endless conveyors which act on opposite sides of a bale to throw the bale into a trajectory path from the rear of the thrower.

The principal object of this invention is to provide a bale conveyor for performing the described functions which is efficient and is substantially less complicated than the known bale conveying devices.

Another object of this invention is to provide a fluid-actuated bale thrower which is adapted to be mounted on a conventional type of pick-up baler.

Another object of this invention is to provide a bale conveyor in which bales are propelled by directing compressed air directly against the end of the bale.

A further object of this invention is to provide bale actuated means for operating a pneumatic-type bale thrower.

A further object of this invention is to provide means in a pneumatic bale thrower for varying the distance the bales are thrown.

A still further object of this invention is to provide a new and improved method of conveying bales.

Other objects of this invention will be apparent hereinafter from the specification and from the recital in the appended claims.

In the drawings:

FIG. 1 is a longitudinal sectional view of the bale thrower and showing the valve door in position to allow air to pass into the conduit and against the end of the bale.

FIG. 2 is a cross section on the line 2—2 of FIG. 1, but showing the valve door closed by a bale.

FIGS. 3 and 4 show a second embodiment on the invention in which a sensing device is employed to control the flow of air to the conduit.

Referring now to the drawings by numerals of reference, and particularly to FIG. 1, 10 denotes the bale case of a hay baler from which bales B successively emerge. Mounted on bale case 10 and operable to throw each emerging bale through a trajectory path to a trailing wagon, not shown, is a bale thrower 12. The bale thrower 12 comprises a tubular conduit 14, an air supply source 16, and valve means 18 for controlling the supply of air to the tubular conduit 14.

Bale thrower 12 is pivotally mounted on bale case 10 by brackets 20 for lateral swinging movement about a vertical axis. Tubular conduit 14 comprises a first section 22 having an inlet 24, and a second section 26 having an outlet 28. Seals 30 are installed in conduit 14 adjacent inlet 24 and outlet 28 to prevent the escape of air while the projected bale is gaining momentum.

Air supply source 16 comprises a low-pressure air pump 32 of conventional construction and is adapted to be driven from the baler flywheel, not shown, or other power means. Pump 32 is mounted on bale case 10 at 34. A supply line 36 extends from pump 32 to a supply tank 38 carried by thrower 14 on vertical support members 40—40 extending downwardly from conduit 14. Tank 38 must be sufficiently large to provide the volume of air required to throw one bale. Supply line 36 includes a relief valve 42 having a line 43 for connection to an air gage, not shown, and a flexible conduit connection 44 to allow the thrower 12 to pivot about a vertical axis. The pressure in tank 38 can be regulated by adjusting the setting of relief valve 42. It will be apparent that the distance the bales are thrown can be controlled by regulating the pressure in tank 38.

Valve means 18 comprises a door 46 pivotally mounted at 48 adjacent the junction of conduit sections 22 and 26; door 46 is adapted to be received in opening 47 in the conduit wall. A plunger 50 is carried on door 46 by fastener 52 and is biased outwardly by spring 54. Plunger 50 is adapted to seat in ring 56 which surrounds opening 58 in supply tank 38. When the plunger 50 is seated in opening 58, a lip portion 60 on door 46 bears against one edge of a spacer 62.

In a second embodiment of the invention, shown in FIGS. 3 and 4, a spring-loaded sensing device 64 is used instead of the valve means 18 previously described. Sensing device 64 comprises a bell crank 66 pivotally mounted to conduit 14 at 68. A spring 70, extending from element 72 on conduit section 26, biases bell crank 66 into the position shown in FIG. 3. A rod 74 extends from bell crank 66 to a conventional two-position air valve in an air supply system, not shown. With the bell crank 66 in the position shown in FIG. 3, rod 74 will have opened the air valve, not shown, to admit air into the conduit 14. In FIG. 4, rod 74 has been moved rearwardly by the action of a bale on bell crank 66 to cut off the air to conduit 14. It will be seen that sensing device 64 is moved to an air-admitting position solely by the action of spring 70; whereas in the first embodiment, shown in FIGS. 1 and 2, door 46 is moved upwardly by the combined action of air pressure in tank 38 and spring 54.

In operation of the device shown in FIGS. 1 and 2, as bales B emerge from the bale chamber 10, they will be moved rearwardly in bale thrower 14 by the action of the baler plunger, not shown. When the bales have reached the positions shown in FIG. 1, the valve door 46 will be forced open by the action of spring 54 and the air pressure in tank 38. Air from tank 38 will be directed against the rear end of the bale shown in the inclined position and the forward end of the adjacent bale. The force of the air will serve to propel the inclined bale rapidly out of conduit section 26 and into a trailing wagon. Movement of the adjacent bale is prevented by the bale emerging from the bale case which acts as a stop means. This operation will be automatically repeated as soon as the next bale has moved to the inclined position and has passed beyond door 46.

The operation of the embodiment shown in FIGS. 3 and 4 is the same as described above, except that sensing device 64 in the conduit 14 controls an air valve, not shown, through oscillating lever 74.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An apparatus for handling hay bales of generally uniform cross section and comprising in combination a frame means, a conduit on said frame means and having an outlet at one end, said conduit one end extending upwardly so that the bales conveyed therefrom will follow a trajectory path, said conduit having a portion at least of its length which substantially conforms in cross section to the cross section of the bales conveyed, a source of compressed fluid, and valve means for selectively directing the force of said compressed fluid against an end of a bale for projecting the bale through said conduit when said bale has reached a predetermined position in said conduit.

2. An apparatus, as recited in claim 1, wherein said source of compressed fluid comprises an air pump, a relief valve, and an air tank.

3. An apparatus, as recited in claim 1, wherein said valve means is bale actuated.

4. An apparatus, as recited in claim 2, wherein said valve means is in fluid communication with said conduit and said air tank, and said valve means is biased in an open position to allow flow of air into said conduit.

5. An apparatus, as defined in claim 1, wherein said conduit has a first section joined to a second section, said first section is at an angle to said second section, and said valve means is located generally at the junction of said first and second sections.

6. An apparatus, as defined in claim 5, wherein said first section has an inlet therein, said outlet is in said second section, and seal means are fastened to said conduit sections adjacent said inlet and adjacent said outlet.

7. A bale thrower mountable on a hay baler having a discharge portion at which successive bales are discharged, said thrower comprising a tubular conduit mounted on said baler for receiving bales as they are discharged from the baler, said conduit having an outlet in one end, said conduit one end extending upwardly so that bales conveyed therefrom will follow a trajectory path, a source of compressed fluid in fluid communication with said conduit, and valve means for selectively directing the force of said compressed fluid against a bale end for projecting the bale through said conduit when said bale has reached a predetermined position in said conduit.

8. A bale thrower, as recited in claim 7, wherein said bales are of generally uniform cross section and said conduit has a portion at least of its length which substantially conforms in cross section to said bale cross section.

9. A bale thrower, as recited in claim 8, wherein said conduit has a first section with an inlet adapted to receive bales from said discharge portion, said conduit has a second section joined to said first section said outlet is in said second section, and said valve means is located generally at the junction of said first and second sections.

10. A bale thrower, as recited in claim 9, wherein a first seal in said first section is located adjacent said inlet and is adapted to tightly engage a bale as it moves into said conduit, and a second seal in said second section is located adjacent said outlet and is adapted to tightly engage a bale as it is ejected from said conduit.

11. A bale thrower, as recited in claim 7, wherein said source of compressed fluid comprises an air pump and a supply tank.

12. A bale thrower, as recited in claim 7, wherein said valve means comprises a pivotally mounted door with a plunger thereon in contact with said fluid, said door is arranged in said conduit to contact bales as they move through said conduit, and said door is adapted to prevent the flow of air into said conduit when contacted by a bale and is biased to an open position to allow flow of air into said conduit when a bale is moved out of contact therewith.

13. A bale thrower, as recited in claim 7, wherein a bale sensing device pivotally mounted on a wall of said conduit is adapted to control the flow of compressed fluid to the conduit.

14. A bale thrower, as recited in claim 13, wherein said sensing device comprises a bell crank, one arm of said crank extends into said conduit in a bale-contacting position, and said bell crank is adapted to control the flow of fluid to the conduit in response to movements of the bales against said one arm.

References Cited

UNITED STATES PATENTS

| 2,101,762 | 12/1937 | Straub | 124—11 |
| 2,601,555 | 6/1952 | Pope | 302—2 |
| 3,132,754 | 5/1964 | Smoker et al. | 214—42 |

ANDRES H. NIELSEN, *Primary Examiner.*